(12) United States Patent
Glickman et al.

(10) Patent No.: US 11,970,122 B2
(45) Date of Patent: Apr. 30, 2024

(54) VEHICLE BUMPER ASSEMBLY WITH INTEGRATED LOWER SUPPORT

(71) Applicant: Ford Global Technologies, LLC, Dearborn, MI (US)

(72) Inventors: David Brian Glickman, Southfield, MI (US); Aaron Peter Klop, Bloomfield Hills, MI (US); Dennis Yee, Milford, MI (US); Satvinder Singh Matharu, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 17/688,179

(22) Filed: Mar. 7, 2022

(65) Prior Publication Data
US 2023/0278513 A1     Sep. 7, 2023

(51) Int. Cl.
*B60R 19/02*     (2006.01)
*B60R 19/12*     (2006.01)
*B60R 19/38*     (2006.01)

(52) U.S. Cl.
CPC ............ *B60R 19/023* (2013.01); *B60R 19/12* (2013.01); *B60R 19/38* (2013.01)

(58) Field of Classification Search
CPC .......... B60R 19/023; B60R 2019/1886; B60R 19/18; B60R 19/38; B60R 19/48; B62D 35/005
USPC ........................................................ 293/120
See application file for complete search history.

(56) References Cited

U.S. PATENT DOCUMENTS

| | | | | |
|---|---|---|---|---|
| 4,264,093 A | * | 4/1981 | Long | B60R 19/56 293/103 |
| 4,758,037 A | * | 7/1988 | Suzuki | B62D 35/005 296/180.1 |
| 8,911,007 B2 | * | 12/2014 | Hirose | B60K 11/08 293/115 |
| 9,783,153 B2 | | 10/2017 | Farooq et al. | |
| 10,155,551 B2 | * | 12/2018 | Miller | G05D 3/10 |
| 11,167,709 B2 | | 11/2021 | Temple | |
| 11,325,521 B2 | * | 5/2022 | Klop | B60R 19/50 |

FOREIGN PATENT DOCUMENTS

| | | |
|---|---|---|
| JP | 4517628 | 8/2010 |
| JP | 5026740 | 9/2012 |
| JP | 5046027 | 10/2012 |

* cited by examiner

*Primary Examiner* — Amy R Weisberg
*Assistant Examiner* — Melissa Ann Bonifazi
(74) *Attorney, Agent, or Firm* — Vichit Chea; Carlson, Gaskey & Olds, P.C.

(57) ABSTRACT

A motor vehicle bumper assembly according to an exemplary aspect of the present disclosure includes, among other things, a main bumper body and an actuator. The actuator includes a bracket mounted to the main bumper body, a screw jack supported by the bracket, and a trolley driven to translate by the screw jack. A lower support is mounted to the trolley. The actuator is configured to translate the lower support relative to the main bumper body from an integrated position to a deployed position.

16 Claims, 5 Drawing Sheets

VEHICLE BUMPER ASSEMBLY WITH INTEGRATED LOWER SUPPORT

TECHNICAL FIELD

This disclosure relates to a vehicle bumper assembly with an integrated lower support for pedestrian protection.

BACKGROUND

Pedestrian protection requirements require a motor vehicle to have a front contacting surface at a certain height from the ground. These requirements are aimed at providing support below the knee to a pedestrian in the event that they contact the front of a moving vehicle, referred to in this disclosure as a "pedestrian protection event."

Some vehicles may have bumpers with a relatively high height and a tailored approach angle to provide ground clearance for ramps, hills, off-road driving, etc. This bumper configuration may also be aesthetically desirable. Pedestrian protection requirements may provide a challenge in maintaining the look and functionality of these bumpers.

SUMMARY

A motor vehicle bumper assembly according to an exemplary aspect of the present disclosure includes, among other things, a main bumper body and an actuator. The actuator includes a bracket mounted to the main bumper body, a screw jack supported by the bracket, and a trolley driven to translate by the screw jack. A lower support is mounted to the trolley. The actuator is configured to translate the lower support relative to the main bumper body from an integrated position to a deployed position.

In a further non-limiting embodiment of the foregoing motor vehicle bumper assembly, the trolley maintains sliding contact with the bracket when driven to translate.

In a further non-limiting embodiment of any of the foregoing motor vehicle bumper assemblies, a motor drives the screw jack. The motor is positioned between a top surface of the bracket and the main bumper body.

In a further non-limiting embodiment of any of the foregoing motor vehicle bumper assemblies, the main bumper body defines a packaging space from a frontmost point to a rearmost point of the main bumper body. The actuator is contained within the packaging space.

In a further non-limiting embodiment of any of the foregoing motor vehicle bumper assemblies, the lower support is positioned forward of and overlaps a stationary lower portion of the main bumper body in the integrated position.

In a further non-limiting embodiment of any of the foregoing motor vehicle bumper assemblies, the stationary lower portion is uncovered in the deployed position.

In a further non-limiting embodiment of any of the foregoing motor vehicle bumper assemblies, a grille opening is included. The main bumper body defines a top and side edges of the grille opening and the lower support is the frontmost surface defining a bottom edge of the grille opening in the integrated position.

In a further non-limiting embodiment of any of the foregoing motor vehicle bumper assemblies, the lower support is positioned forward of and overlaps a stationary lower portion of the main bumper body in the integrated position. The stationary lower portion is the frontmost surface defining the bottom edge of the grille opening in the deployed position.

In a further non-limiting embodiment of any of the foregoing motor vehicle bumper assemblies, a close-out panel is attached to the main bumper body and the lower support. The close-out panel extends from a retracted configuration in the integrated position to an extended configuration in the deployed position.

In a further non-limiting embodiment of any of the foregoing motor vehicle bumper assemblies, the lower support includes an angled surface. An angle of the angled surface relative to the horizontal is the same in both the integrated and deployed position.

In a further non-limiting embodiment of any of the foregoing motor vehicle bumper assemblies, a rear reinforcement member is attached to an interior facing surface of the lower support.

In a further non-limiting embodiment of any of the foregoing motor vehicle bumper assemblies, the bracket is mounted to the main bumper body alone.

A motor vehicle according to another exemplary aspect of the present disclosure includes, among other things, a frame and a main bumper body mounted to the frame. An actuator is mounted to the main bumper body at a location laterally spaced from the frame. A lower support is mounted to the at least one actuator. The actuator is configured to translate the lower support relative to the main bumper body from an integrated position to a deployed position.

In a further non-limiting embodiment of the foregoing motor vehicle, the actuator includes a bracket mounted to the main bumper body alone, a screw jack supported by the bracket, and a trolley mounted to the lower support and driven to translate by the screw jack.

In a further non-limiting embodiment of any of the foregoing motor vehicles, the bracket is mounted to the main bumper body laterally outside of a location where the main bumper body is mounted to the vehicle front frame.

In a further non-limiting embodiment of any of the foregoing motor vehicles, a control controls the actuator. The control is in communication with a vehicle processor.

In a further non-limiting embodiment of any of the foregoing motor vehicles, the control receives vehicle parameters from the vehicle processor and determines when to move the lower support based on the vehicle parameters.

In a further non-limiting embodiment of any of the foregoing motor vehicles, the control receives commands for moving the lower support from the vehicle processor.

In a further non-limiting embodiment of any of the foregoing motor vehicles, the control moves the lower support to the deployed position when a speed of the vehicle is above a lower threshold and below an upper threshold.

A method for installing a vehicle bumper assembly according to an exemplary aspect of the present disclosure includes, among other things, mounting an actuator to a main bumper body and to a lower support of a motor vehicle. The actuator is configured to translate the lower support relative to the main bumper body from an integrated position to a deployed position. The main bumper body is mounted to a frame of the motor vehicle subsequent to mounting the actuator.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle bumper assembly with an integrated lower support designed for pedestrian protection. An exemplary bumper assembly may include a main bumper body and a lower support translating relative to the main bumper body from an integrated position to a deployed position.

Figure 1:
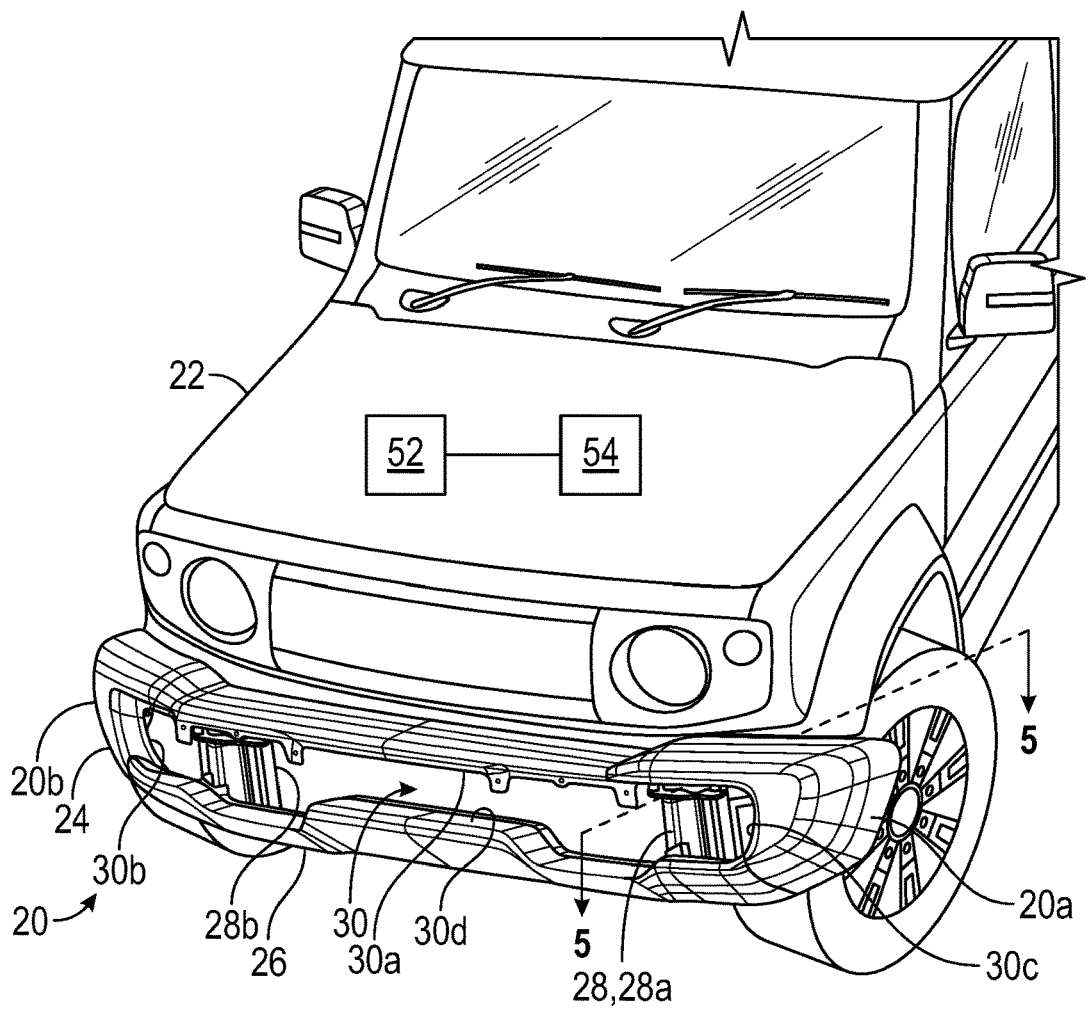
FIG. 1 is a front view of a vehicle including a vehicle bumper assembly in an integrated position.

FIG. 1 illustrates a vehicle bumper assembly 20 for a motor vehicle 22. The vehicle bumper assembly 20 is shown in an integration position in FIG. 1. In an example, the vehicle 22 is a sport utility vehicle (SUV). However, the vehicle 22 could alternatively be configured as a car, a truck, a van, or any other type of motor vehicle within the scope of this disclosure. The vehicle 22 could also be a conventional motor vehicle, a battery powered hybrid or electric vehicle, or an autonomous vehicle (i.e., a driverless vehicle).

The vehicle bumper assembly 20 may include a main bumper body 24, a lower support 26, and actuators 28. The lower support 26 is attached to the main bumper body 24 via the actuators 28. In an example, the actuators 28 include a first actuator 28a located towards a first lateral side 20a of the vehicle bumper assembly 20 and a second actuator 28b located towards a second, opposed lateral side 20b of the vehicle bumper assembly 20.

In the integrated position, the lower support 26 mates with the main bumper body 24 such that the lower support 26 and main bumper body 24 have the appearance of a uniform component. Said another way, the lower support 26 and the main bumper body 24 together form a continuous frontmost surface, or "A-surface," of the vehicle bumper assembly 20. In an example, the main bumper body 24 and lower support 26 are formed of metal, however other materials, including various plastics, may be used.

In an example, the vehicle bumper assembly 20 includes a grille opening 30. In the integrated position, the main bumper body 24 defines a top edge 30a and side edges 30b/30c of the grille opening 30, and the lower support 26 is the frontmost surface, or "A-surface," defining a bottom edge 30d of the grille opening 30.

Figure 2:
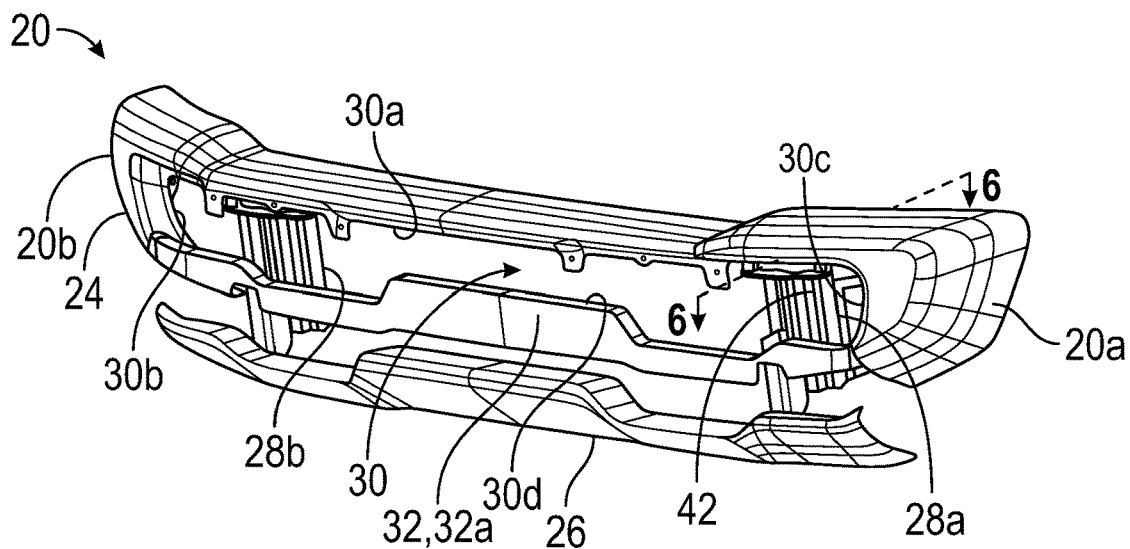
FIG. 2 is a front view of the vehicle bumper assembly of FIG. 1 in a deployed position.

FIG. 2 shows the vehicle bumper assembly 20 in a deployed position. The actuators 28 are configured to translate the lower support 26 vertically down (e.g., toward the ground) from the integrated position to the deployed position. The main bumper body 24 and lower support 26 may be tailored so that the vehicle bumper assembly 20 maintains an Off-Road/rugged aesthetic in the integrated position while providing pedestrian protection in the deployed position at certain speeds of the vehicle 22.

The lower support 26 may be positioned forward of a stationary lower portion 32 of the main bumper body 24, such that the lower support 26 substantially overlaps the stationary lower portion 32 in the integrated position and the stationary lower portion 32 is substantially uncovered in the deployed position. The shape of the stationary lower portion 32 may be tailored to match the lower support 26 so that the stationary lower portion is hidden behind the lower support 26 in a front view of the vehicle bumper assembly 20. In the deployed position, the stationary lower portion 32 is the frontmost, or "A-surface," defining the bottom edge 30d of the grille opening 30.

Vehicle bumper assembly 20 may desirably move backward, or "stroke backward," relative to a vehicle 22 to absorb forces. In the context of pedestrian protection, it is desirable that all points of contact for the pedestrian's leg stroke back uniformly. Stationary lower portion 32 provides a support surface 32a to aid in the stroking function of the vehicle bumper assembly 20 during a pedestrian protection event.

Figure 3:
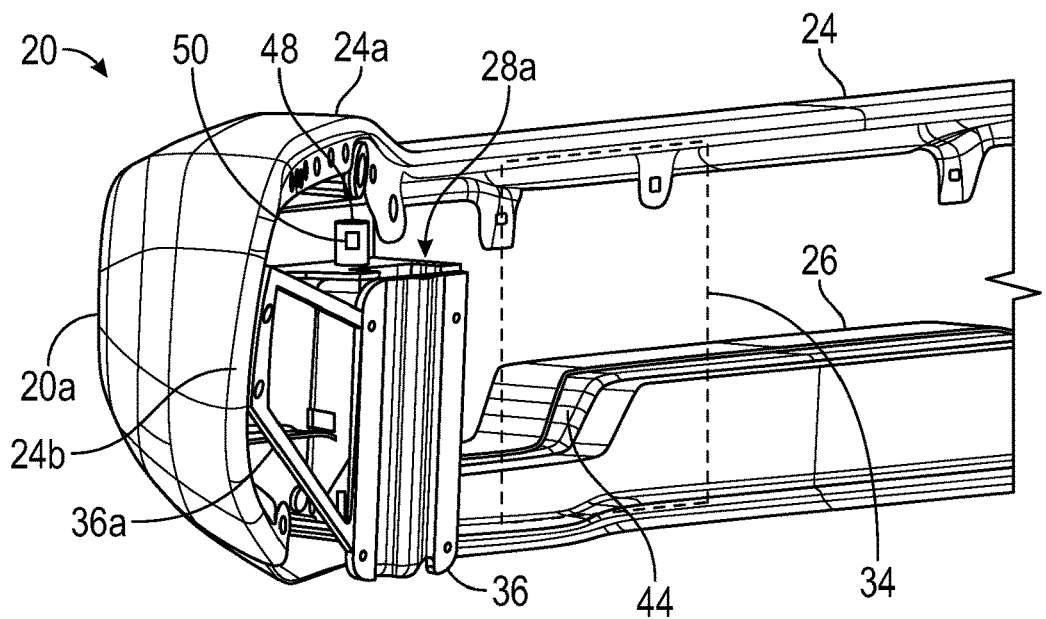
FIG. 3 is a rear view of a portion of the vehicle bumper assembly of FIG. 1 in the integrated position.
Figure 4:
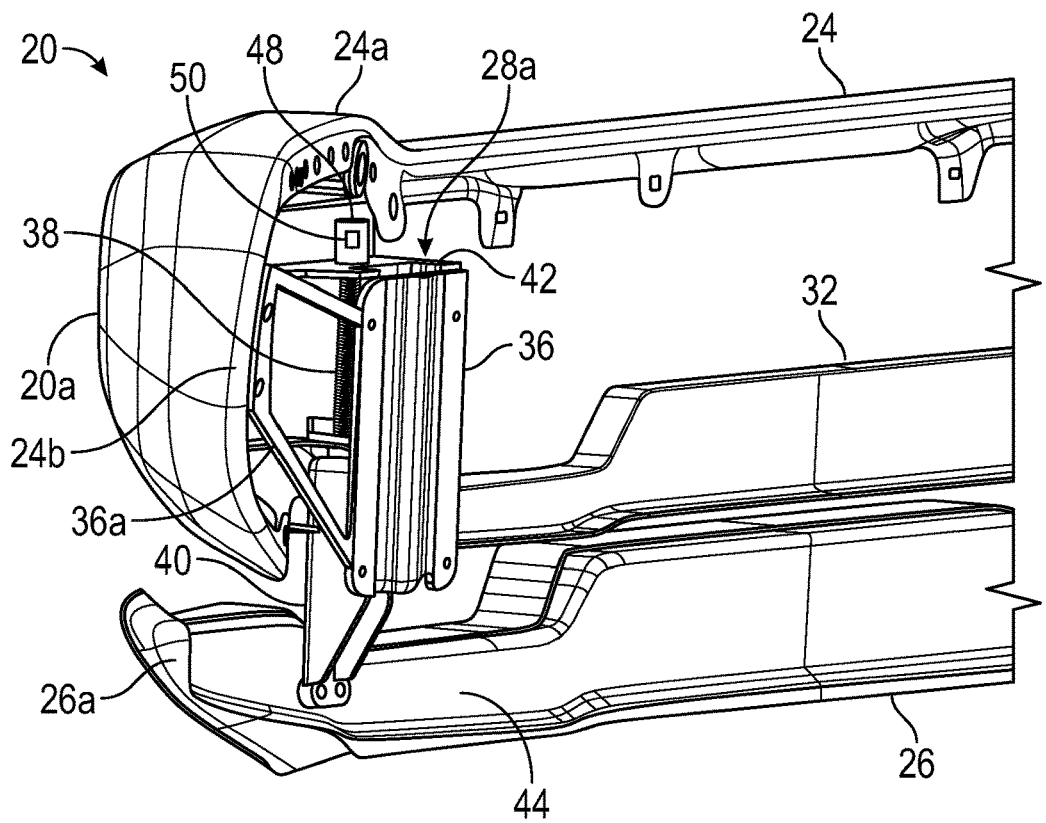
FIG. 4 is a rear view of a portion of the vehicle bumper assembly of FIG. 1 in the deployed position.

FIGS. 3 and 4 illustrate select rear portions of the vehicle bumper assembly 20 in the integrated and deployed position, respectively. The main bumper body 24 is mounted to the vehicle 22 via a vehicle front frame 34, which is schematically illustrated using dashed lines in FIG. 3. Each of the actuators 28a/28b may include a bracket 36 mounted to the main bumper body 24, a screw jack 38 rotatably supported by the bracket 36, and a trolley 40 mounted to the lower support 26. The trolley 40 is configured to mate with the screw jack 38. The trolley 40 may be driven to translate by rotation of the screw jack 38, thereby translating the lower support 26 relative to the main bumper body 24. Although a "screw jack" actuation system is shown, other methods of translating lower support 26 are within the scope of this disclosure, such as a hydraulic actuator, pneumatic actuator, step-motor actuator, etc.

In FIG. 3, a mounting location of the vehicle front frame 34 is towards the first lateral side 20a of the vehicle bumper assembly 20. However, it should be understood that the vehicle front frame 34 may also mount to the main bumper body 24 at a location toward the second lateral side 20b of the vehicle bumper assembly. In an example, the bracket 36 of each actuator 28 is mounted to the main bumper body 24 at a location laterally outside of any location where the vehicle front frame 34 is mounted to the main bumper body 24. That is, the bracket 36 is mounted to the main bumper body 24 alone, and the bracket 36 is laterally spaced from and unconnected to the vehicle front frame 34. The bracket 36 may include a flange 36a attaching to a laterally outmost side 24b of the main bumper body 24. The bracket 36 may also attach to a top portion 24a of the main bumper body 24.

Mounting the actuators 28 to the main bumper body 24 alone allows the lower support 26 to travel with the stroke of the main bumper body 24 during a pedestrian protection event. This may advantageously maintain the supported position of a pedestrian's leg for a longer period during the event. On the other hand, if the actuator 26 were mounted to a comparably more rigid vehicle front frame 34, the path of travel of the lower support 26 may not coincide with that of the main bumper body 24 during a pedestrian protection event.

In an example, the trolley 40 maintains sliding contact with the bracket 36 when the trolley 40 is driven to translate by the screw jack 38 from the integrated position to the deployed position. The trolley 40 may travel within a guide slot 42 of the bracket 36 (shown in FIG. 2). This configuration avoids excessive loading of the screw jack 38 and provides the lower support 26 with rigidity relative to the main bumper body 24 in the deployed position to maintain alignment and absorb forces in a pedestrian protection event.

In an example, a rear reinforcement member 44 is attached to the lower support 26. The rear reinforcement member 44 may be positioned between the lower support 26 and the stationary lower portion 32 of the main bumper body 24, and mounted to an interior facing surface 26a of the lower support 26. The rear reinforcement member 44 may be completely hidden behind the lower support 26 in a front view of the vehicle bumper assembly 20. The rear reinforcement member 44 provides rigidity to the lower support to better resist pedestrian protection forces and other light loads to the lower support 26 in the deployed position. In an example, the rear reinforcement member 44 is metal, and may be the same material or a different material than the lower support 26.

Figure 5:
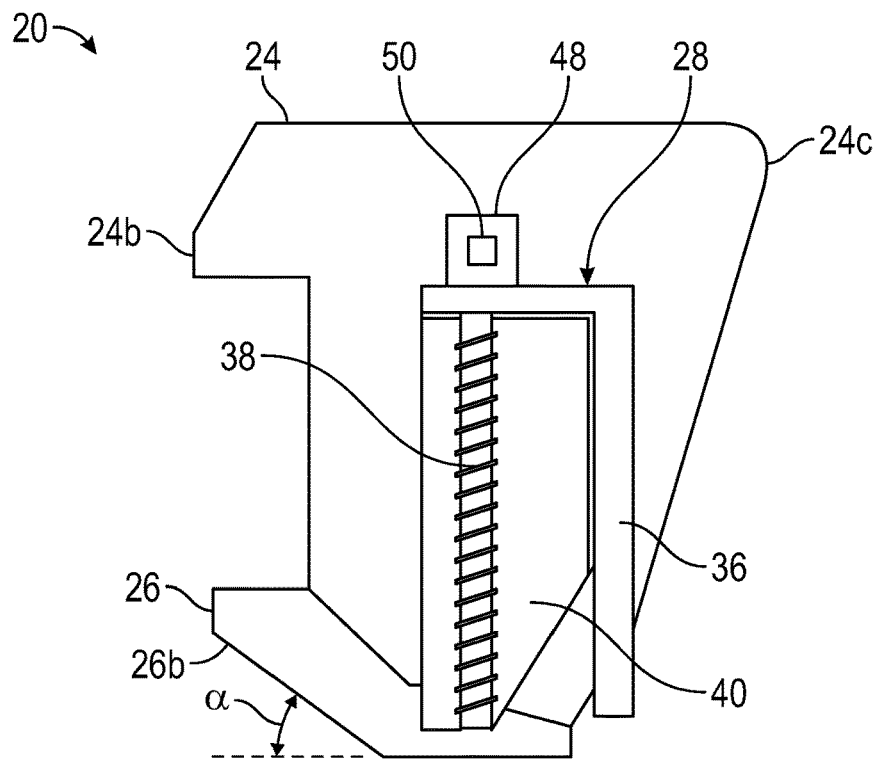
FIG. 5 is a cross-sectional view of the vehicle bumper assembly taken at line 5-5 in FIG. 1.

FIG. 5 illustrates a cross section of the vehicle bumper assembly 20 in the integrated position taken at line 5-5 in FIG. 1. The main bumper body 24 includes a packaging space P defined from a frontmost point 24b to a rearmost point 24c of the main bumper body 24. In an example, the actuators 28 are fully contained within the packaging space of the main bumper body 24. That is, the screw jack 38 is positioned between the frontmost point 24b and rearmost point 24c of the main bumper body. This configuration provides advantages in installation and replacement, as the entire vehicle bumper assembly 20, including the pedestrian protection lower support 26, are attached to the vehicle 20 by the main bumper body 24 mounting to the vehicle front frame 34.

Figure 6:
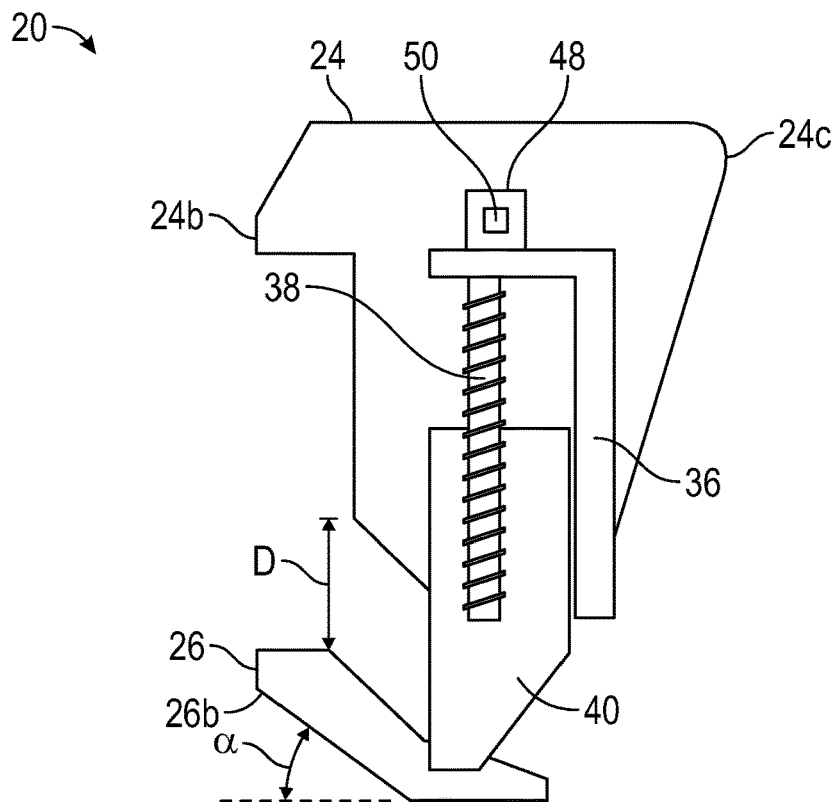
FIG. 6 is a cross-sectional view of the vehicle bumper assembly taken at line 6-6 in FIG. 2.

FIG. 6 illustrates a cross section of the vehicle bumper assembly 20 in the deployed position taken at line 6-6 in FIG. 2. The lower support 26 may include an angled surface 26b that extends at an angle α relative to the horizontal. With continued reference to FIG. 5, the angle α is maintained between the integrated position and deployed position. In examples, the angle α ranges from zero to 90°. In one example, the angle α is about 30°. Maintaining the angle a provides ground clearance benefits to the vehicle 22 mounting vehicle bumper assembly 20 by better maintaining an approach angle of the vehicle 22 mounting bumper assembly 20 in the deployed position. The approach angle is defined as the maximum angle of a slope onto which the vehicle 22 can climb from a horizontal plane without interference from the bumper assembly 20, i.e., the bumper assembly 20 contacting the slope.

A motor 48 may drive rotation of the screw jack 38 to control the translation of the lower support 26. In an example, the motor 48 is mounted between a top surface 36a of the bracket 36 and the top 24a of the main bumper body 24. The motor 48 may include a control 50 that is in communication with a vehicle processor 52 of the vehicle 22. The vehicle processor 52 may communicate with sensors 54 and/or a user interface 56 (shown schematically in FIG. 1) to determine the speed and/or driving mode of vehicle 22. Sensors 54 may include, but are not limited to, radar, sonar, LIDAR (Light Detection and Ranging), ultrasonic, wheel speed sensors, etc.

Figure 7:
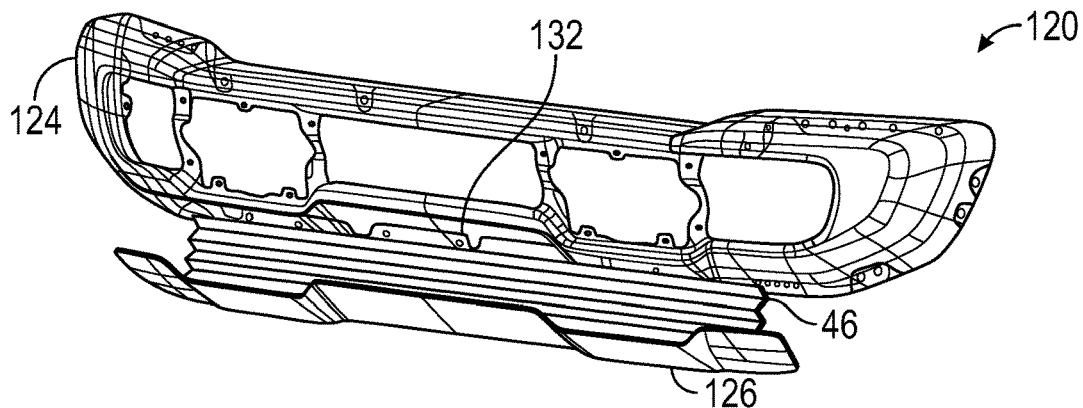
FIG. 7 illustrates another example vehicle bumper assembly with a close-out panel.

FIG. 7 illustrates another example vehicle bumper assembly 120. In this disclosure, like reference numerals designate like elements where appropriate and reference numerals with the addition of one-hundred designate modified elements that are understood to incorporate the same features and benefits of the corresponding elements. Vehicle bumper assembly 120 includes a close-out panel 46. The close out panel 46 extends between a lower support 126 and a stationary lower portion 132 of a main bumper body 124 in the extended position. The close out panel 46 is adjustable/reconfigurable to fit between the lower support 126 and the stationary lower portion 132 in the integrated position and is thus hidden from view. In an example, the close-out panel 46 is configured like an accordion that folds between the deployed position and integrated position. The close-out panel 46 protects from objects or debris that could be trapped or scooped into the open area between the main bumper body 124 and lower support 126. In a pedestrian protection event, the close-out panel 46 may help to prevent a pedestrian's limb from stepping through the open area between the main bumper body 124 and lower support 126.

The vehicle 22 may be operable in an Off-Road mode in which certain vehicle systems (suspension and/or powertrain, for example) have settings adapted for operation on unpaved, rough surfaces. Such an Off-Road mode may be selected manually by a vehicle operator at the user interface 56 and/or may be applied automatically based on parameters detected by the sensors 54. When the vehicle 22 is operated in an Off-Road mode, it is expected that it will be traveling in an area in which pedestrians are not likely to be present. Therefore, the lower support 26 may stay in the integrated position when the vehicle 22 is in an Off-Road mode.

In one example, the control 50 may include software to determine appropriate movement of the lower support 26 based on vehicle parameters received from the vehicle processor 52, such as vehicle speed or driving mode. In another example, the vehicle processor 52 determines appropriate movement of the lower support 26 and communicates commands to the control 50 to drive movement of the lower support 26 accordingly.

The control 50 and/or vehicle processor 52 may further be programmed to command that the lower support 26 be lowered a specific deployed distance D (shown in FIG. 6) relative to the main bumper body 24. This advantageously allows the lower support 26 height in the deployed position to easily adjust as necessary. In an example the distance D may be up to 300 mm, or more narrowly up to 150 mm.

Figure 8:
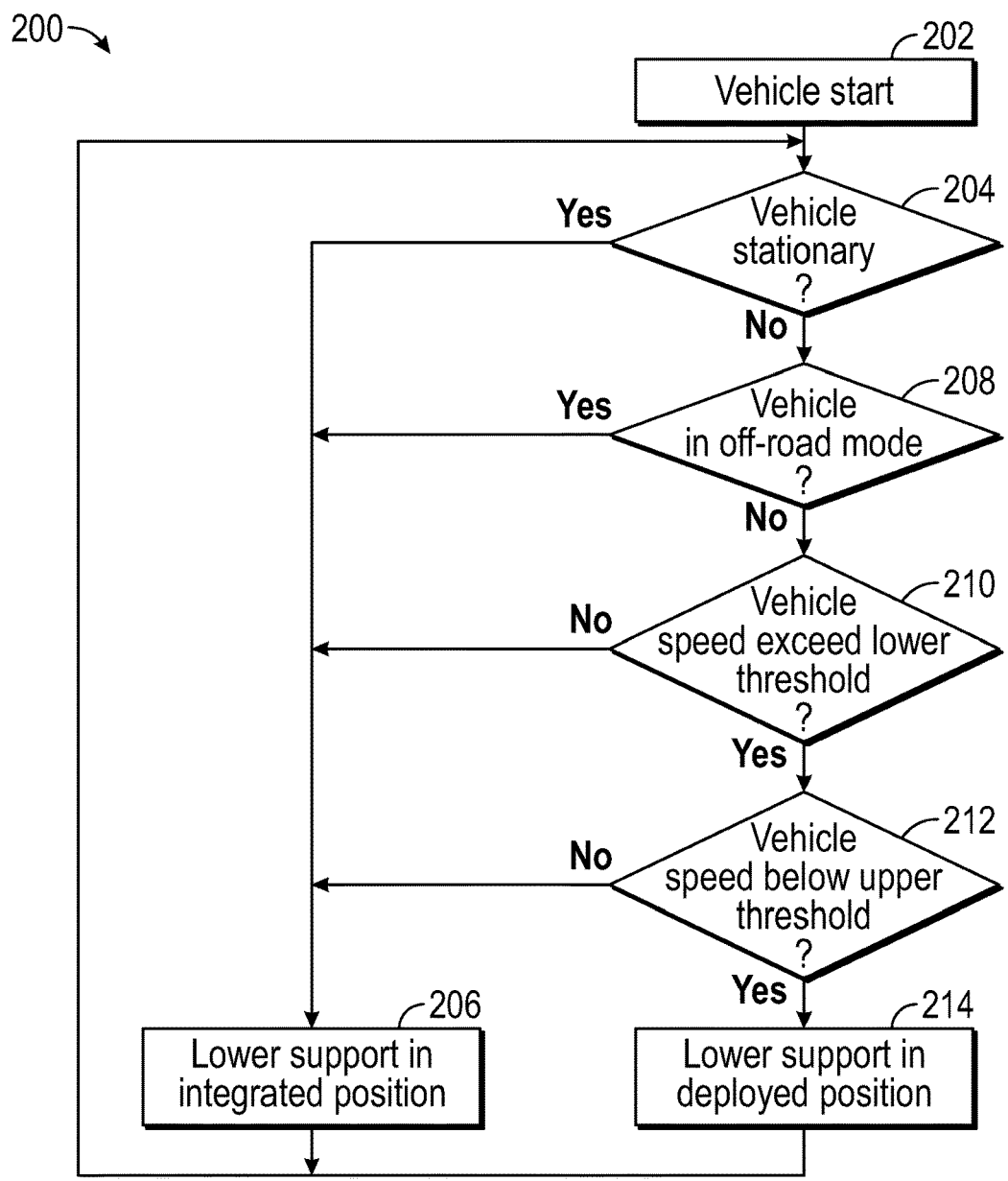
FIG. 8 schematically illustrates a method for moving a vehicle bumper assembly from an integrated position to a deployed position.

FIG. 8 illustrates a example method 200 for that may be executed by the control 50 or vehicle processor 52 to determine when to transition the lower support 26 from the integrated position to the deployed position. The method 200 may be programmed in a memory of the control 50 or vehicle processor 52 as an algorithm. The method 200 is initiated by the vehicle 22 starting at 202. Whether the vehicle is stationary is determined at 204. If the vehicle 22 is stationary, then the lower support 26 remains in the integrated position at 206. If the vehicle is moving, then the method 200 may determine whether the vehicle 22 is in an Off-Road driving mode at 208. If the vehicle 22 is determined to be in an Off-Road mode, then the lower support 26 will again remain in the integrated position at 206 while moving.

If the vehicle 22 is moving and is not in an Off-Road mode, then the method 200 may determine whether the speed of the vehicle 22 has exceeded a lower threshold at 210. In an example, the lower threshold is 20 kilometers per hour (kph), though other speeds may be used. If the speed is below the lower threshold then the lower support 26 will remain in the integrated position at 206. If the speed is above the lower threshold, then the method 200 next determines whether the speed of the vehicle 22 exceeds an upper threshold at 212. In an example, the upper threshold is 45 kph, though other speeds may be used. If the speed exceeds the lower threshold and is below the upper threshold, then the lower support 26 will transition to the deployed position at 214. If the speed is above the upper threshold, then the lower support 26 will return to the integrated position at 206. Once a determination of the position of the lower support 26 has been made at either 206 or 214, the method 200 repeats at 204 to continuously determine the appropriate position of the lower support 26 as the vehicle 22 changes its speed and/or operating mode.

Figure 9:
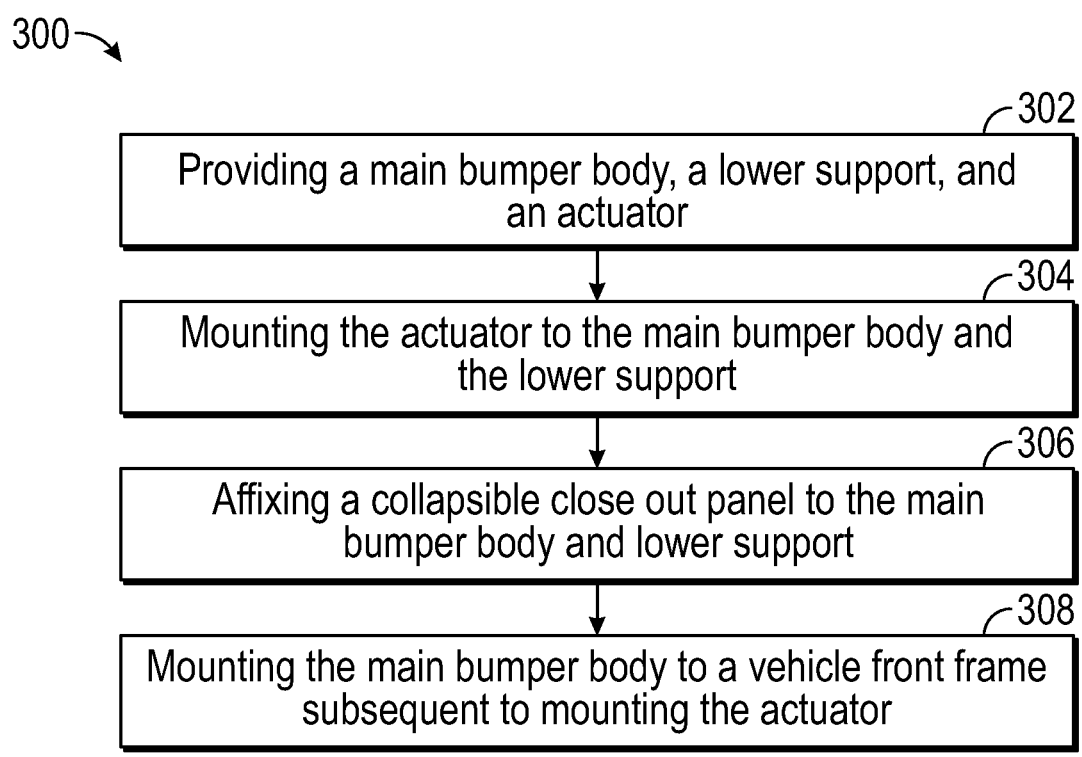
FIG. 9 schematically illustrates a method of installing a vehicle bumper assembly.

FIG. 9 illustrates a method 300 of installing the vehicle bumper assemblies 20, 120 described above. At step 302 a main bumper body 24, a lower support 26, and an actuator 28 are provided. Most typically, the main bumper body 24, lower support 26, and actuator 28 are provided as prefabricated components. However, this provision may alternatively involve fabrication of one or more of the components of the main bumper body 24, the lower support 26, and/or the actuator 28. Providing the actuator 28 may further include mounting a screw jack 38 on a bracket 36, and mounting a trolley 40 to the screw jack 38 and in sliding contact with the bracket 36.

Step 304 includes mounting the actuator 28 to the main bumper body 24 and to the lower support 26. Mounting the actuator 28 to the main bumper body 24 may involve, either manually or through automation, aligning the bracket 36 with the main bumper body 24 and affixing the bracket 36 to the main bumper body 24. Mounting the actuator 28 to the lower support 26 may involve, either manually or through automation, aligning the trolley 40 with the lower support 26 and affixing the trolley 40 to the lower support 26. Step 306 includes, either manually or through automation, aligning and affixing a adjustable close out panel 46 to the main bumper body 24 and lower support 26.

At step 308, the main bumper body 24 is mounted to a vehicle front frame 34 subsequent to the step of mounting the actuator 28 to the main bumper body 24 and lower support 26. Mounting the main bumper body 24 to the vehicle front frame 34 may involve aligning the vehicle front frame 34 to the main bumper body 24 at locations laterally inside of the location of the actuator 28, and affixing the main bumper body 24 to the vehicle front frame. The affixing noted in steps 304-308 may be accomplished by inserting and tightening fasteners, which may be, but are not limited to, screws, rivets, and/or bolts. Further, the bumper assembly 20 may be dissembled/uninstalled via the reverse procedure of method 300 for repair, component replacement, maintenance or the like.

Vehicle bumper assemblies 20/120 may maintain the desirable Off-Road/rugged aesthetic of a light duty truck or SUV in the integrated position while providing robust and easily adjustable pedestrian protection in the deployed position. The disclosed configurations are relatively compact, and provide benefits related to packaging and installation. Further, the disclosed configurations provide advantages relating to ground clearance and approach angle of the vehicles 22 mounting bumper assemblies 20/120. Additionally, the disclosed configurations facilitate a more uniform stroking of the bumper assemblies 20/120 in the deployed position.

Although the different non-limiting embodiments are illustrates as having specific components or steps, the embodiments of this disclosure are not limited to those particular combinations. It is possible to use some of the components or features from any of the non-limiting embodiments in combination with features or components from any of the other non-limiting embodiments. In other words, placement and orientation of the various components of vehicle bumper assemblies 20 and 120 are shown schematically and could vary within the scope of this disclosure. In addition, the various figures accompanying this disclosure are not necessarily drawn to scale, and some features may be exaggerated or minimized to emphasize certain details of a particular component.

It should be understood that like reference numerals identify corresponding or similar elements through the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A motor vehicle bumper assembly comprising:
a main bumper body;
an actuator including a bracket mounted to the main bumper body, a screw jack supported by the bracket, and a trolley driven to translate by the screw jack;
a lower support mounted to the trolley;
a grille opening;
wherein the actuator is configured to translate the lower support relative to the main bumper body from an integrated position to a deployed position;
wherein the main bumper body defines a top and side edges of the grille opening and the lower support is the frontmost surface defining a bottom edge of the grille opening in the integrated position; and
wherein the lower support is positioned forward of and overlaps a stationary lower portion of the main bumper body in the integrated position, and the stationary lower portion is the frontmost surface defining the bottom edge of the grille opening in the deployed position.

2. The motor vehicle bumper assembly of claim 1, wherein the trolley maintains sliding contact with the bracket when driven to translate.

3. The motor vehicle bumper of claim 1, further comprising a motor driving the screw jack, the motor positioned between a top surface of the bracket and the main bumper body.

4. The motor vehicle bumper assembly of claim 1, wherein the main bumper body defines a packaging space from a frontmost point to a rearmost point of the main bumper body, and the actuator is contained within the packaging space.

5. The motor vehicle bumper assembly of claim 1, further comprising a close-out panel attached to the main bumper body and the lower support, the close-out panel extending from a retracted configuration in the integrated position to an extended configuration in the deployed position.

6. The motor vehicle bumper assembly of claim 1, wherein the lower support includes aft front-facing angled surface, and wherein an angle of the angled surface relative to the horizontal is the same in both the integrated and deployed position.

7. The motor vehicle bumper assembly of claim 1, further comprising a rear reinforcement member attached to an interior facing surface of the lower support.

8. The motor vehicle bumper assembly of claim 1, wherein the bracket is mounted to the main bumper body alone.

9. A motor vehicle comprising:
a frame;
a main bumper body mounted to the frame;
an actuator mounted to the main bumper body, the actuator including a bracket mounted to the main bumper body at a location laterally spaced from the frame, a screw jack supported by the bracket, and a trolley mounted to a lower support and driven to translate by the screw jack; and
wherein the actuator is configured to translate the lower support relative to the main bumper body from an integrated position to a deployed position.

10. The motor vehicle of claim 9, wherein the bracket is mounted to the main bumper body laterally outside of a location where the main bumper body is mounted to the vehicle front frame.

11. The motor vehicle of claim 9, further comprising a control controlling the actuator, the control in communication with a vehicle processor.

12. The motor vehicle of claim 11, wherein the control receives vehicle parameters from the vehicle processor and determines when to move the lower support based on the vehicle parameters.

13. The motor vehicle of claim 11, wherein the control receives commands for moving the lower support from the vehicle processor.

14. The motor vehicle of claim 11, wherein the control moves the lower support to the deployed position when a speed of the vehicle is above a lower threshold and below an upper threshold.

15. The motor vehicle of claim 9, further comprising a grille opening,
wherein the main bumper body defines a top and side edges of the grille opening and the lower support is the frontmost surface defining a bottom edge of the grille opening in the integrated position; and
wherein the lower support is positioned forward of and overlaps a stationary lower portion of the main bumper body in the integrated position, and the stationary lower portion is the frontmost surface defining the bottom edge of the grille opening in the deployed position.

16. A method for installing a vehicle bumper assembly, the method comprising:
mounting a bracket of an actuator to a main bumper body of a motor vehicle;
mounting a trolley of the actuator to a lower support, the trolley configured to be driven to translate relative to the bracket via a screw jack, and the actuator configured to translate the lower support relative to the main bumper body from an integrated position to a deployed position; and
mounting the main bumper body to a frame of the motor vehicle subsequent to mounting the actuator such that the frame is affixed to the main bumper body at a location laterally spaced from the bracket and the frame is unconnected to the bracket.

* * * * *